Patented Feb. 2, 1937

2,069,554

UNITED STATES PATENT OFFICE 2,069,554

METHOD OF TREATING TITANIUM DIOXIDE

Reginald Hill Monk and Archibald Stewart Ross, Montreal, Quebec, Canada, assignors to American Zinc, Lead & Smelting Company, St. Louis, Mo., a corporation of Maine No Drawing. Application November 5, 1934, Serial No. 751,672

13 Claims. (Cl. 134—58)

When titanium salts are hydrolyzed there is present on the precipitate so obtained a considerable amount of adsorbed $SO_4$ ions which are deleterious to the quality of the oxide when employed as a pigment and it has heretofore been proposed to remove these ions by the addition of bases or basic salts in the wet way. These methods employ substances such as sodium, potassium and ammonium hydroxides or the carbonates or oxides of the metals of group II of the periodic table, such as magnesium or barium carbonate. When these methods are employed a separate operation is necessary embodying the addition to and the thorough mixing with the precipitated $TiO_2$ of the base or basic substances selected. In this operation the character of the precipitate may be changed so that it becomes less suitable for use as a pigment. For example, if ammonia is used, the precipitate may be dispersed to an injurious degree and much difficulty may be experienced in recovering the ammonium sulfate. Furthermore, if the salt so formed is insoluble or not readily volatile, its presence is deleterious to the $TiO_2$, and operations such as washing, with filtration or decantation, must be employed to separate the salt from the $TiO_2$, and these operations involve additional cost and consumption of time which it is highly desirable to avoid. Moreover, while the methods above indicated, to a large degree, remove the acid radical from the $TiO_2$, they do not completely eliminate the same, traces of sulfate remaining after such treatment, and control of the color of the treated pigment is limited to a narrow range.

If a slurry of $TiO_2$ containing adsorbed $SO_4$ ions is calcined in the ordinary way at temperatures common in industrial practice, such as 800° C.–900° C., a large part of the adsorbed $SO_4$ is driven off, but if the heating is continued to higher temperatures or for a longer period in an effort to remove the $SO_4$ completely, sintering of the particles takes place with solution of traces of impurities which tend to darken the pigment, and opacity of the $TiO_2$ is lost. It is thus apparent that calcination alone is not effective for the complete removal of the undesired acid radical.

The present invention has for its objects the avoidance of dispersion of the precipitated $TiO_2$ and the ready recovery of the ammonium (or other) sulfate formed, at a reduced cost and consumption of time, and to enable the color of the $TiO_2$ produced to be more effectively controlled, to the end that various shades of color, dark gray, light gray, blue white or cream may be obtained, as desired.

With this object in view the invention, generally stated, consists in subjecting a wet slurry of $TiO_2$ (hydrated titanium dioxide) to a drying operation to remove water, this operation being preferably at a temperature about 100° C. but at a temperature below that which would result in dehydration of the $TiO_2$. Complete loss of water from a hydrated $TiO_2$ does not occur below 700° C., and hence the $TiO_2$ is dried below that temperature. The dried $TiO_2$ is then treated with gaseous ammonia (or equivalent gaseous substance having basic properties) thus partially reducing the $TiO_2$ to a lower oxide, with the formation of ammonium (or other) sulfate. The term "hydrated" is herein used, not in the sense of a chemical compound, but in the sense of water loosely held in chemical bond but highly adsorbed and removable only at high temperature. This treatment with gaseous ammonia or other gaseous substance may be, and preferably is, at a temperature less than that employed in the drying operation. The $TiO_2$ with the ammonium (or other) sulfate is then heated to a point at which evolution of the products of the reaction will occur. This should be in the presence of oxygen, as by use of an air current, and at a temperature above 250° C., and preferably ranging from this up to 1000° C., and continued until the pigment is dehydrated. This removes the sulfate and other products of the reaction from the $TiO_2$ and reoxidizes it to any desired extent, depending upon the time and temperature at which the operation takes place, and this sulfate in vapor form is blown or swept off by the air or other gaseous current and collected for other uses.

After treatment with the gaseous ammonia, and before subjecting the same to elevated temperatures, as indicated above, the $TiO_2$ pigment will have a more or less gray color. During the heating operation in the presence of oxygen, however, the pigment is reoxidized, and as this reoxidation proceeds, the color of the pigment changes from a decided gray to a lighter gray and then to a bluish white, and if the operation continues long enough, to a creamy white, and by interrupting the operation at the proper stage the color and opacity of the $TiO_2$ are effectually controlled through the control of the temperature and oxygen supply. Furthermore, the rearrangement of particles that is the necessary adjunct to the development of opacity in titanium oxide is expeditiously and effectively facilitated during this operation.

Any suitable apparatus may be employed in the practice of the invention, and as the same forms no part of the invention, the apparatus need not be described herein.

While preferred temperatures in the several steps have been indicated, it will be understood that these temperatures can be varied within reasonable limits. Moreover, while gaseous ammonia has been indicated as the preferred gas to be employed for neutralizing the acid radical on the $TiO_2$, it will be understood that other basic substances occurring naturally in or convertible to, the gaseous state, may be employed in place of gaseous ammonia.

It will be readily understood by those skilled in the art that a deficiency of oxygen due to the formation of lower oxides brought about by the action of ammonia results in discoloration of the $TiO_2$, and by the present invention the progressive reoxidation of the pigment in the final heating step secures progressive restoration of the color of the pigment through the grades above indicated.

Having thus described the invention, what is claimed is:

1. The method of treating hydrated titanium dioxide precipitated by hydrolysis of titanium salts, which consists in drying the dioxide, without dehydration subjecting the dried dioxide to the action of gaseous ammonia, and then subjecting the same to the action of oxygen and a temperature ranging from approximately 500° C. to 1000° C.

2. In a method of treating hydrated titanium dioxide precipitated by hydrolysis of titanium salts, the steps of drying the dioxide without dehydrating the same, and then subjecting the dried $TiO_2$ to the action of gaseous ammonia.

3. In a method of treating hydrated titanium dioxide precipitated by hydrolysis of titanium salts, the steps of drying without dehydrating the dioxide at a temperature approximately 100° C., and then subjecting the same to the action of gaseous ammonia.

4. In a method of treating hydrated titanium dioxide precipitated by hydrolysis of titanium salts, the steps of drying the dioxide at a temperature approximately 100° C. without dehydrating the same, and then subjecting the dried dioxide to the action of gaseous ammonia at a lower temperature.

5. In a method of treating hydrated titanium dioxide precipitated by hydrolysis of titanium salts, the steps which consist in drying without dehydrating the dioxide, then subjecting the same to the action of gaseous ammonia, and then raising the temperature of the dioxide to the point at which evolution of the products of the reaction occurs.

6. In a method of treating hydrated titanium dioxide precipitated by hydrolysis of titanium salts, the steps of drying without dehydrating the dioxide, then treating the same with gaseous ammonia at a temperature at which ammonia is adsorbed, and then raising the temperature to the point at which evolution of the products of reaction occurs.

7. In a method of treating hydrated titanium dioxide precipitated by hydrolysis of titanium salts, the steps of subjecting the dioxide without dehydration to the action of gaseous ammonia, and then adding a gas to sweep out the products evolved in the reaction between the ammonia and the adsorbed $SO_4$ ions present in the dioxide.

8. In a method of treating hydrated titanium dioxide precipitated by hydrolysis of titanium salts, the steps of subjecting the dioxide without dehydration to the action of gaseous ammonia, and then vaporizing by heat the ammonium sulfate resulting from the reaction and removing the same by a gas current.

9. In a method of treating hydrated tianium dioxide precipitated by hydrolysis of titanium salts, the steps of subjecting the dioxide without dehydration to the action of gaseous ammonia, and then vaporizing by heat the ammonium sulfate resulting from the reaction.

10. In a method of treating hydrated titanium dioxide precipitated by hydrolysis of titanium salts, the steps of treating the dioxide without dehydration with gaseous ammonia and then heating the same to a temperature of not less than 250° C.

11. In a method of treating hydrated titanium dioxide precipitated by hydrolysis of titanium salts, the steps of neutralizing with gaseous ammonia the $SO_4$ ions adsorbed on the dioxide and without dehydration, and reoxidizing the same to develop color and opacity of the pigment.

12. In a method of treating hydrated titanium dioxide precipitated by hydrolysis of titanium salts, the steps of drying without dehydrating the dioxide and at a temperature of approximately 100° C., treating the same with gaseous ammonia at a temperature at which the gaseous ammonia is adsorbed, raising the temperature to evolve products of the reaction, and sweeping out these products with a gas and oxidizing the pigment.

13. In a method of treating hydrated titanium dioxide precipitated by hydrolysis of titanium salts, the steps of drying without dehydrating the dioxide at a temperature of approximately 100° C., treating the dried dioxide with gaseous ammonia at a lower temperature, then raising the temperature to the point where evolution of the products of reaction occurs, admitting oxygen, and developing the color and opacity of the pigment by controlling the temperature and oxygen supply.

REGINALD HILL MONK.
ARCHIBALD STEWART ROSS.